(12) United States Patent
Schwegman (10) Patent No.: US 7,520,670 B2
(45) Date of Patent: Apr. 21, 2009

(54) WIRELESS TEMPERATURE SENSING SYSTEM FOR LYOPHILIZATION PROCESSES

(75) Inventor: John Jeffrey Schwegman, 1116 Azalea La., Bloomington, IN (US) 47401

(73) Assignee: John Jeffrey Schwegman, Bloomington, IN (US)

(*) Notice: Subject to any disclaimer, the term of this patent is extended or adjusted under 35 U.S.C. 154(b) by 200 days.

(21) Appl. No.: 11/115,056

(22) Filed: Apr. 26, 2005

(65) Prior Publication Data
US 2006/0239331 A1    Oct. 26, 2006

(51) Int. Cl.
G01K 1/14 (2006.01)
G01K 13/00 (2006.01)
G01K 1/16 (2006.01)
G08C 19/12 (2006.01)
B65B 7/00 (2006.01)

(52) U.S. Cl. ............... 374/150; 374/120; 374/141; 374/148; 340/870.17; 215/200

(58) Field of Classification Search ............. 374/178, 374/152, 150, 120, 208, 163, 148, 141, 179, 374/185; 340/870.17; 215/200
See application file for complete search history.

(56) References Cited

U.S. PATENT DOCUMENTS

| | | | | |
|---|---|---|---|---|
| 1,455,909 A | * | 5/1923 | Ditton | 219/430 |
| 2,137,094 A | * | 11/1938 | Nodine | 374/141 |
| 2,254,570 A | * | 9/1941 | Hailey | 220/367.1 |
| 2,355,821 A | * | 8/1944 | Rice | 374/208 |
| 2,676,914 A | * | 4/1954 | Podbielniak | 202/160 |
| 3,454,178 A | | 7/1969 | Bender et al. | |
| 3,580,047 A | * | 5/1971 | Simpson | 374/22 |
| 4,059,006 A | * | 11/1977 | Mizutani et al. | 374/21 |
| 4,626,662 A | * | 12/1986 | Woolf | 219/501 |
| 4,718,776 A | * | 1/1988 | Gilland et al. | 374/170 |
| 4,930,902 A | * | 6/1990 | Yata et al. | 374/150 |
| 4,966,469 A | | 10/1990 | Fraser et al. | |
| 5,265,522 A | * | 11/1993 | Schultz | 99/343 |
| 5,367,786 A | | 11/1994 | Jennings | |
| 5,367,787 A | | 11/1994 | Ikeda et al. | |
| 5,447,374 A | * | 9/1995 | Fraser et al. | 374/208 |
| 5,498,079 A | * | 3/1996 | Price | 374/208 |
| 5,522,155 A | | 6/1996 | Jones | |
| 5,596,814 A | * | 1/1997 | Zingle et al. | 34/296 |
| 5,689,895 A | | 11/1997 | Sutherland et al. | |

(Continued)

OTHER PUBLICATIONS

Steven L. Nail, John J. Schwegman, Vincent Kamp, Analytical Tools for Characterization of Frozen Systems in the Development of Freeze-Dried Pharmaceuticals, American Pharmaceutical Review, 2000, pp. 17-25.

(Continued)

*Primary Examiner*—Gail Verbitsky
(74) *Attorney, Agent, or Firm*—Krieg DeVault LLP (57) ABSTRACT

A wireless parameter sensing system for a flask for use in lyophilization as well as a method of controlling a lyophilization process based on the sensed readings is disclosed. The wireless parameter sensing system may include a stopper adapted to be removably secured to an open end of the flask. A control unit may be positioned within an inner portion of the stopper. A parameter sensor may be connected with the control unit. A radio frequency transmitter may be connected with the control unit, wherein the control unit is operable to periodically transmit a parameter reading from the parameter sensor with the radio frequency transmitter.

14 Claims, 6 Drawing Sheets

U.S. PATENT DOCUMENTS

| | | | |
|---|---|---|---|
| 5,732,837 A * | 3/1998 | Jones | 215/311 |
| 5,741,069 A * | 4/1998 | Egel | 374/146 |
| 5,969,606 A * | 10/1999 | Reber et al. | 340/540 |
| 6,045,258 A * | 4/2000 | Sorgen, III | 374/150 |
| 6,163,979 A | 12/2000 | Oetjen et al. | |
| 6,202,540 B1 * | 3/2001 | Johnson et al. | 99/285 |
| 6,226,887 B1 | 5/2001 | Tenedini et al. | |
| 6,293,695 B1 * | 9/2001 | Schmermund | 374/1 |
| 6,311,409 B1 | 11/2001 | Coppa et al. | |
| 6,367,974 B1 * | 4/2002 | Lin | 374/179 |
| 6,539,645 B2 | 4/2003 | Savarese | |
| 6,539,842 B1 | 4/2003 | Chapman et al. | |
| 6,564,471 B1 | 5/2003 | Sutherland et al. | |
| 6,591,739 B2 * | 7/2003 | Norcross | 99/342 |
| 6,643,950 B2 | 11/2003 | Lambert et al. | |
| 6,698,923 B2 * | 3/2004 | Bedetti et al. | 374/208 |
| 6,746,646 B2 | 6/2004 | Winkler | |
| 6,836,220 B2 * | 12/2004 | Brown | 340/870.37 |
| 6,848,196 B2 | 2/2005 | Brulls | |
| 6,970,100 B2 * | 11/2005 | Lovegreen et al. | 340/870.17 |
| 2001/0040911 A1 * | 11/2001 | Rubenstein | 374/141 |
| 2003/0012256 A1 * | 1/2003 | Burkholder | 374/150 |
| 2003/0202558 A1 | 10/2003 | Chung et al. | |
| 2004/0015058 A1 | 1/2004 | Besson et al. | |
| 2004/0062293 A1 | 4/2004 | Breinlinger | |
| 2004/0071190 A1 | 4/2004 | Chang | |
| 2004/0122489 A1 | 6/2004 | Mazar et al. | |
| 2004/0240511 A1 | 12/2004 | Yin et al. | |
| 2004/0247015 A1 * | 12/2004 | Wojan et al. | 374/120 |
| 2005/0008061 A1 | 1/2005 | Kaneko | |
| 2006/0026971 A1 * | 2/2006 | Sharpe | 62/126 |

OTHER PUBLICATIONS

John J. Schwegman, Measuring Changes in Protein Secondary Structure In-Situ During Freezing and Freeze-Drying Using Infrared Microscopy, A Thesis Submitted to the Faculty of Purdue University, May 2004.

* cited by examiner

WIRELESS TEMPERATURE SENSING SYSTEM FOR LYOPHILIZATION PROCESSES

BACKGROUND OF THE INVENTION

1. Technical Field

The present invention relates generally to lyophilization and more particularly, to a wireless temperature sensing system for lyophilization processes.

2. Related Art

Freeze-drying is a technique by which water is removed from a frozen system through a process of sublimation. Sublimation is the process by which, at low temperatures and pressures, water is removed from a frozen system by going directly from a solid to a gas, thereby skipping the liquid phase. This process allows physical structure, established during freezing, to be maintained in the dried state.

After sublimation, the evolved water vapor migrates to a condenser where it freezes and collects. Skipping the solution phase through sublimation allows certain compounds, which are not stable for extended periods of time in solution, to be stabilized by placing them in a state of "suspended animation" within the dried solid. At the time of use, the dried product is returned to its original solution state by adding sterile water and mixing. It is of particular importance to monitor product temperature during freeze-drying as the product can be destroyed if it is not held at the appropriate temperature.

The current technique for measuring product temperature is by placing thermocouples directly in the product. These thermocouples are composed of two different wires (typically containing copper and constantan, respectively) that are welded at the tip. The welded end of the wire is placed in the solution contained in the vials, and the other end plugs into a socket in the freeze-dryer chamber which feeds information to a computer. The thermocouple is essentially a circuit that is formed by joining the ends of two wires from different metals, and the junction is exposed to different temperatures. An electrical potential (emf) develops between the two wires that is directly related to the temperature difference, and the current flow in the circuit.

Many problems are encountered with conventional thermocouples. The wires running from the vials to the sockets in the chamber regularly knock other vials over spilling liquids on the shelf. Additionally, adding thermocouples and plugging them in by an operator in an aseptic environment has the potential to contaminate other samples within the batch. Removing the wired connection between the vial and socket would greatly reduce the aforementioned problems. Additionally, large-scale pharmaceutical freeze-drying technology is currently moving towards complete process automation including automatic loading and unloading of the vials from the dryer. This automated process makes product temperature monitoring via conventional thermocouples impossible and valuable product temperature information is lost.

As a result of the aforementioned problems, a need exists for a method and system of monitoring the temperature of product during the freeze-drying process that does not require operator intervention into the freeze-drying chamber and may be readily adapted for automatic loading and unloading of the vials.

SUMMARY OF THE INVENTION

The present invention discloses a temperature sensing system that may be used for freeze-drying processes that addresses and solves the problems associated with prior temperature sensing systems. The temperature sensing system includes a vial or flask that has a stopper that has been designed to incorporate a wireless temperature sensing system. The wireless temperature sensing system within the stopper is operable to take temperature readings of a substance in the flask at predetermined time intervals. The temperature readings may then be transmitted to a radio frequency receiver that may then report the temperature readings to a lyophilization machine control unit. The lyophilization machine control unit may then adjust operation of a lyophilization machine in response to the received temperature readings.

The stopper may include a temperature sensor, such as a thermocouple or infrared laser temperature sensor, which is operable to take temperature readings of the substance or solution contained in the flask. The temperature sensor may be connected with a control unit or control circuit that may be located within the stopper. The control unit may be connected with a radio frequency transmitter that may be at least partially located within the stopper. The control unit is operable to cause the radio frequency transmitter to transmit temperature readings to a radio frequency receiver that may be located inside or outside of a freeze dryer chamber of the lyophilization machine.

The radio frequency receiver may be connected with the lyophilization machine control unit, which in turn, may be connected with the lyophilization machine. The lyophilization machine control unit may use the temperature readings received from the wireless temperature sensing system located within or on the stopper to adjust settings for the lyophilization machine. For example, the lyophilization machine control unit may cause the lyophilization machine to raise or lower the shelf temperature and/or vacuum level of the freeze dryer chamber in response to the product temperature readings.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
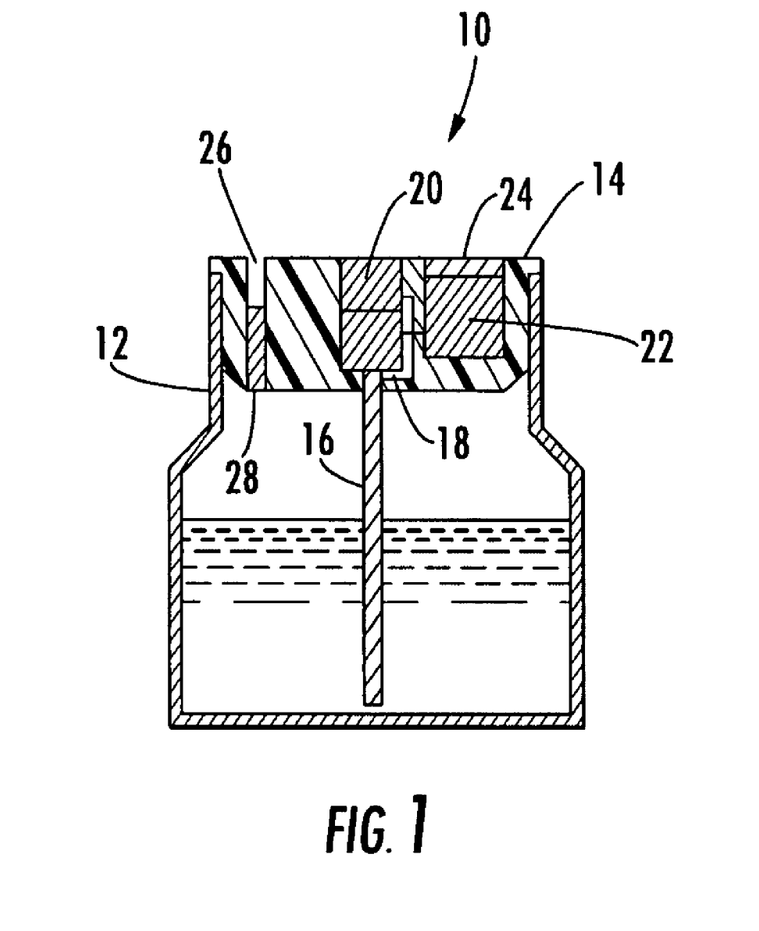
FIG. 1 is a cross-sectional view of a flask and stopper.

Referring to FIG. 1, the present invention discloses a parameter or temperature sensing system 10 preferentially designed for use in lyophilization processes. The temperature sensing system 10 includes a freeze drying flask or vial 12 that is designed to hold a product or substance to be processed by lyophilization or freeze-drying. The flask 12 may come in several different shapes and sizes depending upon the nature of the application. For the purpose of the present invention, it is important to note that the flask 12 is used to hold the product to be freeze-dried and may come in several different shapes and sizes.

A positioning device or stopper 14 may also be included to ensure proper placement of a probe, in the form of a temperature sensor 16 in FIG. 1, at a specific position inside of the flask 12. The stopper 14 may be formed of plastic, rubber, Noryl® or other similar materials and is preferentially made from a material that has good insulating qualities that can resist cold temperatures or various other environmental conditions. The stopper 14 may be formed such that it is capable of being removably attached to or inserted in an open end of the flask 12. In other embodiments of the present invention, the stopper 14 may be snap-fit or friction fit to the open end of the flask 12.

As set forth briefly above, the temperature sensing system 10 may include a probe or temperature sensor 16. The temperature sensor 16 depicted in FIG. 1 is a thermocouple, but other temperature sensors are envisioned to have application with the present invention as well. For example, in some embodiments of the present invention an infrared laser temperature sensor may be used instead of a thermocouple. The thermocouple may be a thirty-six gauge type "T" wire with a Teflon® coating and may be encased in a steel sheath, but other types of thermocouples may be used in the present invention as well. Although the preferred probe is disclosed as a temperature sensor, it is envisioned that the present invention will have application in other processes that utilize flasks as well. For example, instead of monitoring temperature, some processes may want to monitor the acidity or pH level of a product. As such, in these embodiments of the present invention a pH sensor or other types of sensors may be used instead of a temperature sensor.

The temperature sensor 16 may be connected with a controller or control unit 18. The control unit 18 may be a microprocessor, an analog circuit or an integrated circuit. Preferentially, the control unit 18 is a microprocessor programmed with an instruction set designed for the temperature sensing system 10. As depicted, the temperature sensor 16 may protrude outwardly from a lower surface of the stopper 14 a predetermined distance into the flask 12. Other sensors may be positioned differently in different embodiments of the invention, but will be directed or positioned such that they may take readings of the contents contained inside of the flask 12.

The control unit 18 may also be connected with a radio frequency transmitter or transceiver 20. In the preferred embodiment, the radio frequency transmitter 20 is used to wirelessly transmit parameter or temperature readings from the temperature sensor 16. As such, the control unit 18 receives a temperature reading from the temperature sensor 16 and then uses the radio frequency transmitter 20 to transmit the temperature reading to a predetermined destination. The stopper 14 is therefore operable to measure the temperature of the substance contained in the flask 12 and then wirelessly transmit a temperature reading to the predetermined destination.

As illustrated in FIG. 1, the stopper 14 may also include a power source 22 that may be connected with the temperature sensor 16, the control unit 18, and the radio frequency transmitter 20. The power source 22 may be a battery, a rechargeable battery or the like. The power source 22 may be positioned in the stopper 14 such that the power source 22 may be removed from the stopper 14 and replaced when its energy source runs out. An insulation cap 24 may be placed over a top surface of the power source 22 in order to insulate the power source 22 within the stopper 14. The cap 24 may be friction fit within the stopper 14 and may be manufactured from the same material as the stopper 14.

The stopper 14 may also include a ventilation aperture 26 that is designed to ventilate water vapor from the flask 12 during the freeze-drying process. The ventilation aperture 26 is open to the atmosphere and allows water vapor, generated from ice sublimation, to flow from the surface of the dried layer to a condenser unit located away from the product chamber. The stopper 14, in some alternative embodiments, may include a porous venting medium 28 that extends across or is positioned inside the inside diameter of the ventilation aperture 26. The porous venting medium 28 may be made from any material that is water vapor permeable, but is preferentially made from a material that is water vapor permeable as well as capable of keeping contaminants out of the flask 12.

Figure 2:
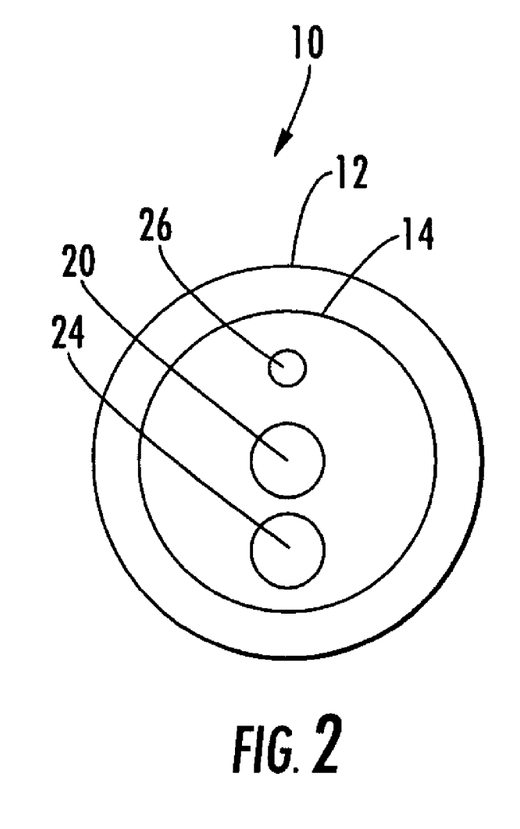
FIG. 2 is a top view of the flask and stopper depicted in FIG. 1.

Referring to FIG. 2, an illustrative top view of the flask 12 and the stopper 14 illustrated in FIG. 1 is set forth. As depicted, an upper surface of the stopper 14 may expose a portion of the radio frequency transmitter 20, the insulation cap 24 for the power source 22 and the ventilation aperture 26. A portion of the radio frequency transmitter 20 may need to be exposed outside of the stopper 14 so that the radio signals generated by the radio frequency transmitter 20 can reach their intended destination (discussed in detail below). In alternative embodiments, the radio frequency transmitter 20 may not be exposed on the outer surface of the stopper 14 but may be entirely encased or located within the stopper 14. In addition, the radio frequency transmitter 20 may also be recessed within the stopper 14 so that a top portion of the radio frequency transmitter 20 is flush with an upper surface of the stopper 14.

Figure 3:
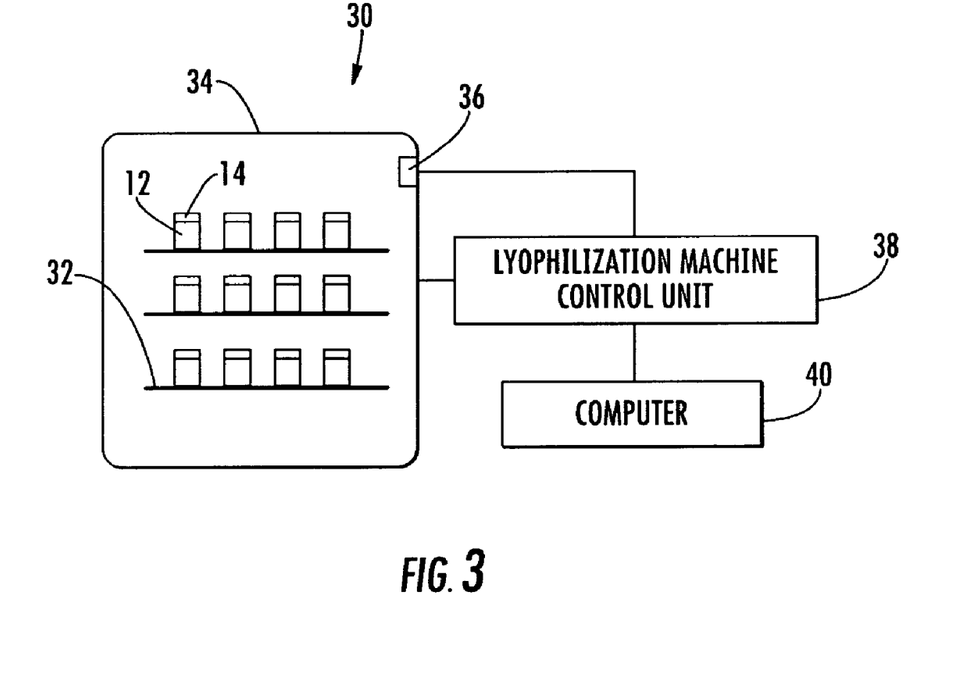
FIG. 3 depicts a basic lyophilization machine.

Referring to FIG. 3, a portion of a basic lyophilization or freeze-drying machine 30 is disclosed. As illustrated, a plurality of flasks 12 containing a solution or substance to be freeze dried may sit or be placed on a plurality of trays 32 that are located within a freeze dryer chamber 34. Preferentially, the flasks 12 are automatically loaded into and automatically unloaded out of the freeze drying chamber 34 through the use of an autoloader. At least one of the flasks 12 may include the stopper 14 set forth and described above.

The temperature sensing system 10 may also include a radio frequency receiver or transceiver 36. The radio frequency receiver 36 may be located inside of the freeze dryer chamber 34. In other embodiments of the present invention, the radio frequency receiver 36 may be located outside of the freeze dryer chamber 34 within radio transmission distance of the radio frequency transmitter 20 of the stopper 14. The radio frequency receiver 36 may be connected with a lyophilization machine control unit 38 that controls operation of the lyophilization machine 30. The lyophilization machine control unit 38 is operable to control, amongst other things, the vacuum level and shelf temperature of the freeze dryer chamber 34. The lyophilization machine control unit 38 may also be connected with a computer 40 that may be operable to store data that relates to the lyophilization process, such as pressure readings and temperature readings. However, the lyophilization machine control unit 38 may also be capable of storing any type of data related to the lyophilization process.

Figure 4:
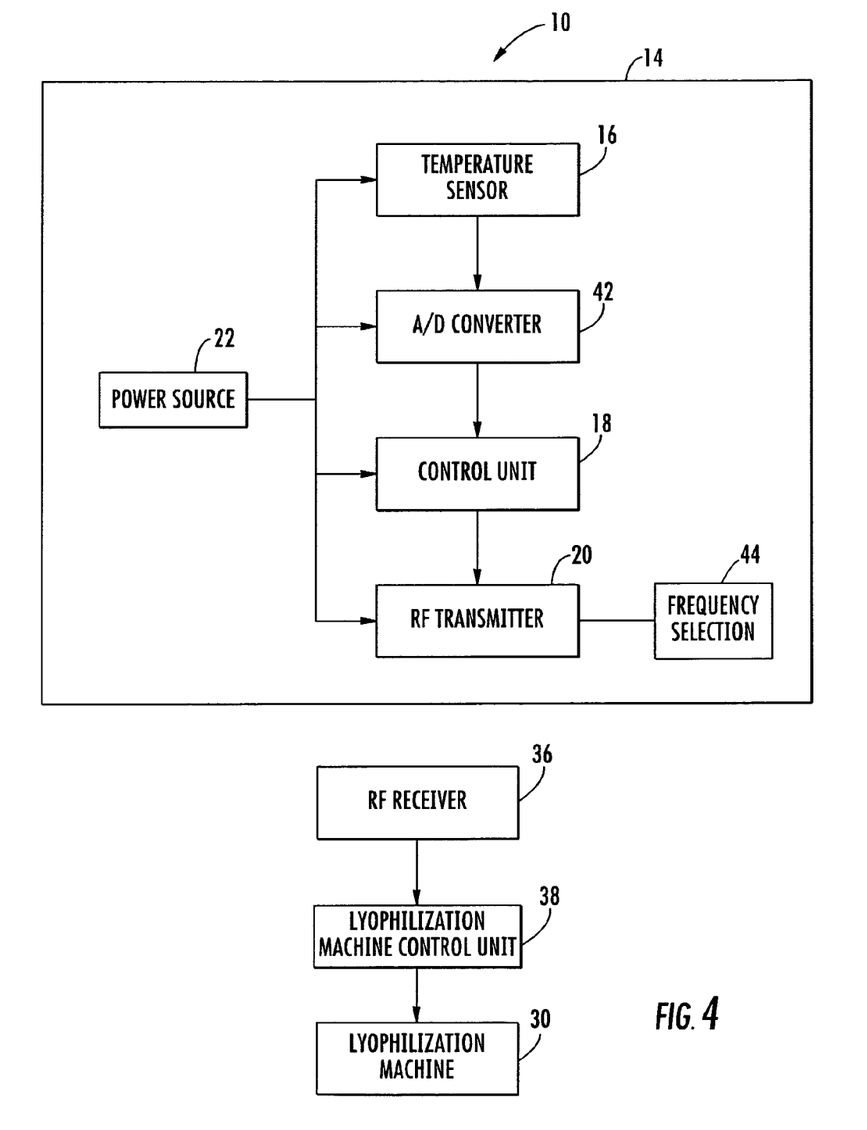
FIG. 4 is a block diagram of the wireless temperature sensing system.

Referring to FIG. 4, a block diagram is illustrated to show how the different components of the present invention may be connected to one another. As illustrated, the stopper 14 of the temperature sensing system 10 may include the temperature sensor 16, the control unit 18, the radio frequency transmitter 20, the power source 22 and an analog-to-digital ("A/D") converter 42. The power source 22 may be connected with each of the above-referenced components or select components. During operation, the temperature sensor 16 generates a temperature signal indicative of the temperature of the substance contained in the flask 12. In some embodiments, the temperature signal may be represented as an analog voltage level that may be directed to the A/D converter 42, which in turn, transforms the analog voltage level into a digital reading that may be directed to the control unit 18. Further, the control unit 18 may be programmed or operable to take a temperature reading at predetermined time intervals (e.g.—every minute). In addition, the control unit 18 may be programmed or operable to associate a unique identifier with each temperature signal that is generated for transmission to thereby uniquely identify each flask 12 within the freeze dryer chamber 34.

The control unit 18 may take the digital temperature reading generated by the A/D converter 42 and transform it into a signal readily adaptable for the radio frequency transmitter 20. It should be noted that the A/D converter 42 may be separate or a part of the control unit 18. The control unit 18 is operable to control the functionality of the radio frequency transmitter 20 so that a radio signal is generated that is sent to the radio frequency receiver 36 indicative of the flask 12 and the temperature of the solution contained in the flask 12.

A frequency selection device 44 may be connected with the radio frequency transmitter 20 for controlling the frequency that the radio frequency transmitter 20 uses to transmit the signal to the radio frequency receiver 36. In some embodiments of the present invention, multiple vials 12 containing the stopper 14 disclosed herein may be placed in the freeze-drying chamber 34. This allows the temperature monitoring system 10 to monitor the temperature of the substance contained in multiple vials 12 at different locations within the freeze-drying chamber 34. For example, two vials 12 containing the stopper 14 disclosed herein may be placed on each shelf 32 in the freeze-drying chamber 34 thereby providing temperature readings at six different locations in the embodiment illustrated in FIG. 3.

The radio frequency receiver 36 may be connected with the lyophilization machine control unit 38. As generally set forth above, the lyophilization machine control unit 38 is operable to control the overall operation of the lyophilization machine 30. For the purpose of the present invention, the lyophilization machine control unit 38 is operable to control the shelf temperature and vacuum level within the freeze dryer chamber 34 of the lyophilization machine 30. As such, if the temperature of the substance in the vials 12 falls above or below a predetermined threshold value, the lyophilization machine control unit 38 may adjust the shelf temperature or vacuum level (or both) of the freeze dryer chamber 34 to maintain the product temperature at appropriate values for any given process.

Figure 5:
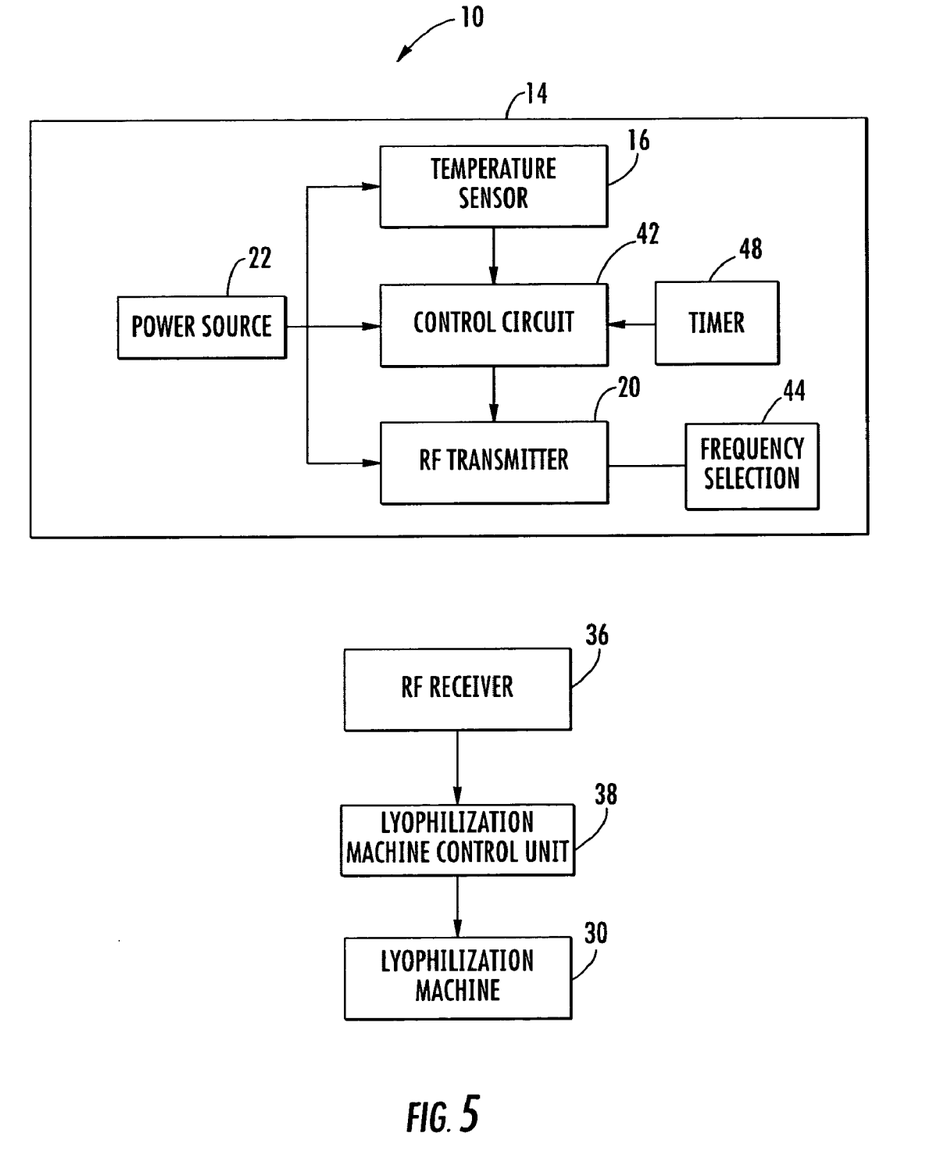
FIG. 5 is a block diagram of another embodiment of the wireless temperature sensing system.

Referring to FIG. 5, an alternative embodiment of the temperature sensing system 10 is illustrated. In this embodiment, the overall functionality of the temperature sensing system 10 remains the same as previously discussed. Instead of the control unit 18 comprising a microprocessor or the like, in this embodiment, a control circuit 46 may be used. As such, in this embodiment of the present invention all of the circuitry may be formed as a specialized integrated circuit on one or more chips or circuit boards that are placed within the stopper 14. In addition, a timer 48 may be included for triggering the taking of a temperature reading. The timer 48 may be operable to cause the stopper 14 to transmit a temperature reading at predetermined time intervals (e.g.—every minute). In addition, the control circuit 46 may be operable to attach a unique identifier to the temperature reading that is transmitted to the radio frequency receiver 36. Various methods exist for creating specialized electronic packages that may be taken advantage of by the present invention.

Figure 6:
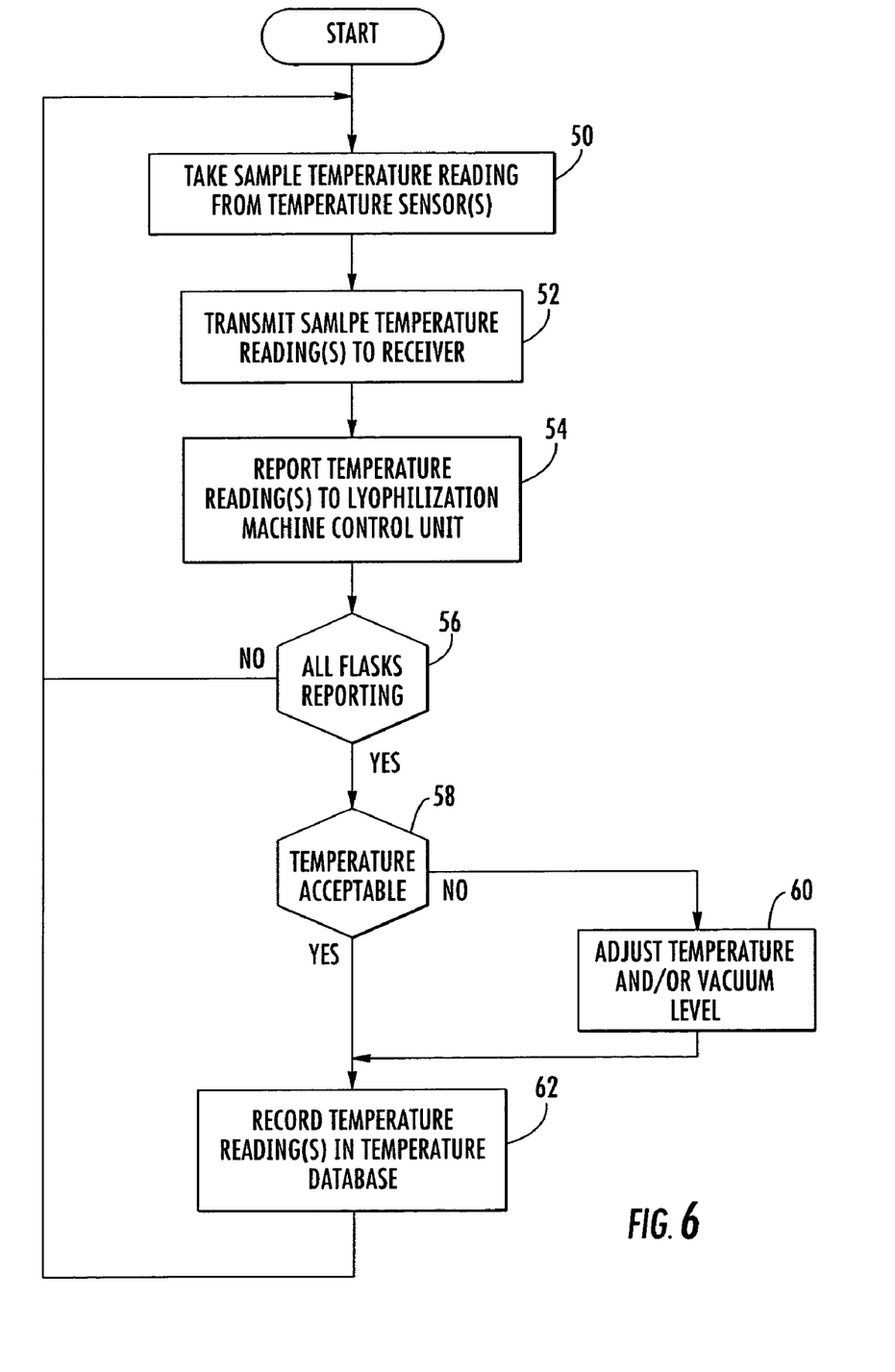
FIG. 6 is a flow chart of the temperature sensing system.

Referring to FIG. 6, an illustrative method in which the temperature sensing system 10 may monitor the temperature of the substance in the vials 12 as well as control the lyophilization machine 30 in response to the sensed readings is set forth. At step 50, a sample temperature reading is taken from one or all of the vials 12 contained in the freeze dryer chamber 34. As set forth above, either the control unit 18 or the control circuit 46 of the stopper 14 may include a timing mechanism or circuit that is operable to cause a temperature reading to be taken at predetermined time intervals (e.g.—every minute).

At step 52, one or more of the temperature readings may be transmitted to the radio frequency receiver 36 from the radio frequency transmitter 20 of each of the stoppers 14. As previously set forth, a unique identifier may be associated with each stopper 14 that is added to the transmitted temperature reading so that each temperature reading received by the radio frequency receiver 36 contains a unique identifier as well as the temperature reading. At step 54, the temperature readings are reported to the lyophilization machine control unit 38. The radio frequency receiver 36 may report the temperature readings to the lyophilization machine control unit 38 one at a time or in a batch of readings.

At step 56, the lyophilization machine control unit 38 may determine if all of the flasks 12 in the freeze dryer chamber 34 have reported a temperature reading. Again, the unique identifier associated with each stopper 14 may assist the lyophilization machine control unit 38 to determine if all stoppers 14 have reported. If all flask readings have not been reported, the temperature sensing system 10 may return to step 50 and wait for the next set of readings from the stoppers 14.

Once the lyophilization machine control unit 38 determines if all flasks 12 have reported their respective readings, the lyophilization machine control unit 38 may determine if the reported temperature values are acceptable at step 58. The lyophilization machine control unit 38 may be programmed with algorithms that are capable of mathematically determining if the actual temperature values are within an acceptable range of values. The range of acceptable values may vary from process to process.

If the reported product temperature values are not within the acceptable range, at step 60 the lyophilization machine control unit 38 may adjust a temperature setting of the lyophilization machine 30 to either raise or lower the shelf temperature of the freeze dryer chamber 34. In addition, the lyophilization machine control unit 38 may also raise or lower the vacuum level of the freeze dryer chamber 34 as well. In other words, the lyophilization machine control unit 38 is operable to raise or lower the shelf temperature or vacuum level settings of the lyophilization machine 30 to maintain the product temperature 34 at acceptable levels. Both shelf temperature and chamber vacuum levels have an effect on product temperature.

The lyophilization machine control unit 38 may record the reported values in a temperature database at step 62. Regardless of whether or not the reported temperature value falls within accepted parameters, the present invention may need to record all temperature readings that are taken by the stopper 14. The database may also include the time of the reading as well as the flask 12 that reported the reading and the location of the flask 12 within the freeze dryer chamber 34. The lyophilization machine control unit 38 may report the readings to the computer 40 set forth in FIG. 3 or may maintain the readings in an internal database that may be accessed by operators. Once this is complete, the temperature sensing process may return to step 50 as set forth in FIG. 6.

Figure 7:
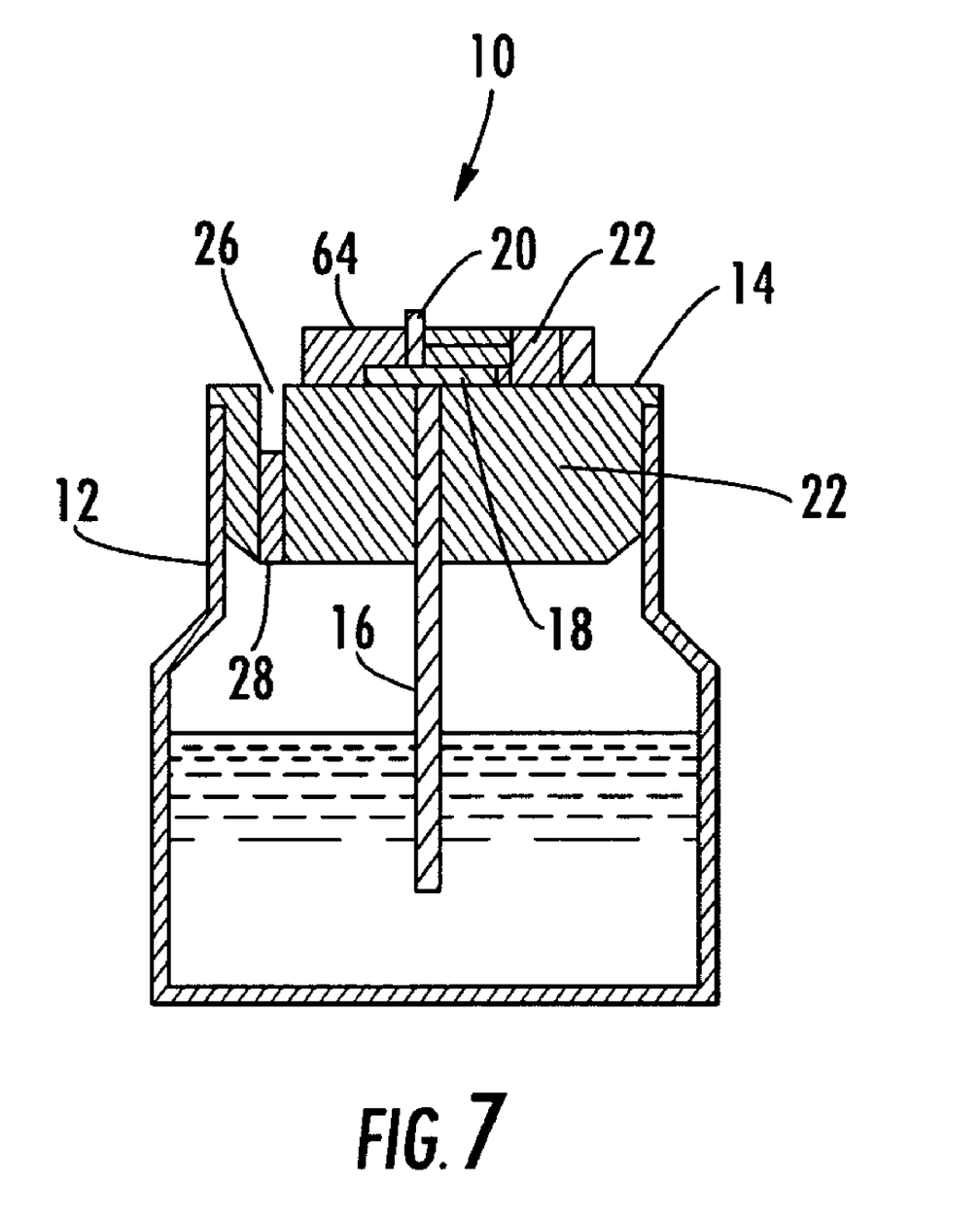
FIG. 7 is a cross-sectional view of a flask and stopper having a wireless temperature sensing system connected with the stopper.

Referring to FIG. 7, another embodiment of the present invention may include a sensor housing 64 that may be connected with an upper surface of the stopper 14. In this embodiment, the electronic components that were positioned within the stopper 14 in the previous embodiment have been moved to within the housing 64. As illustrated, the temperature sensor 16 may fit through an aperture in the stopper 14 and run all the way up to the control unit 18 in the housing 64. All other aspects of the present invention remain the same in this embodiment, but preferentially all of the electronic components are housed within the stopper 14 because of the inherent advantages provided by that particular design.

Although not specifically illustrated, the stopper 14 may come in a package that is shipped to various manufacturing facilities for using in various types of manufacturing processes. Because of the particular type of uses that the stopper 14 is designed for, the package may be a pre-sterilized particle free package that is designed to keep the stopper 14 sterile and particle or contaminate free. The stopper 14 may be sterilized using several commonly used industrial practices or methods such as, for example only, ethylene oxide gas, hydrogen peroxide vapor, gamma irradiation, and electron beam sterilization. The stopper 14 may be packaged particle or contaminate free by packaging the stopper 14 in a clean room or another clean environment. Several different sizes of packages and packaging material may be used as commonly known in the art.

As set forth above, the radio frequency transmitter 20 and the radio frequency receiver 36 may comprise radio transceivers that are operable to both transmit and receive analog and/or digital radio signals. Radio transceivers may be used in embodiments in which multiple stoppers 14 are placed inside the freeze dryer chamber 34. Each control unit 18 may be programmed with a unique identifier that causes the control unit 18 to respond when a predetermined signal is sent by the radio transceiver 36 located in the freeze dryer chamber 34. In other words, each control unit 18 may be programmed to take a temperature reading when it receives a predetermined signal from the radio transceiver 36 located in the freeze dryer chamber 34. As such, the lyophilization machine control unit 38 may be programmed to individually probe each stopper 14 located in the freeze dryer chamber 34 one at a time until all temperature readings have been reported. Once the control unit 18 of a particular stopper 14 receives a temperature reading signal that identifies that particular stopper 14, the stopper 14 will take a temperature reading and transmit the results back to the lyophilization machine control unit 38.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus, comprising:
   a stopper having a body adapted to be removably secured to an open end of a flask;
   a control unit positioned within an interior portion of said body;
   a parameter sensor at least a portion of which is positioned within said interior portion of said body and is connected with said control unit;
   a radio frequency transmitter positioned within said interior portion of said body and is connected with said control unit, wherein said control unit is operable to periodically transmit a parameter reading from said parameter sensor with said radio frequency transmitter;
   a ventilation aperture in said body; and
   a porous venting medium positioned in said ventilation aperture.

2. The apparatus of claim 1, wherein said parameter sensor comprises a thermocouple, wherein a portion of said thermocouple extends downwardly from a lower surface of said stopper a predetermined distance inside said flask.

3. The apparatus of claim 1, further comprising an analog-to-digital converter connected with said parameter sensor and said control unit and positioned within said body, wherein said analog-to-digital converter converts an analog parameter signal from said parameter sensor to a digital signal for use by said control unit.

4. The apparatus of claim 1, wherein a portion of said radio frequency transmitter is exposed on an upper surface of said body of said stopper.

5. The apparatus of claim 1, further comprising a receiver for receiving said parameter reading.

6. The apparatus of claim 1, further comprising a power source removably connected with said control unit, wherein said power source is located within said body of said stopper.

7. A stopper for a flask, comprising:
   a stopper removably connected to an open end of said flask;
   a control unit positioned inside said stopper;
   a parameter sensor connected with said control unit, wherein at least a portion of said parameter sensor is positioned inside said stopper;
   a radio frequency transmitter connected with said control unit, wherein said control unit is operable to periodically transmit a parameter reading from said parameter sensor using said radio frequency transmitter, and wherein at least a portion of said radio frequency transmitter is positioned inside said stopper;
   a power source connected with said control unit and said radio frequency transmitter, wherein said power source is positioned inside said stopper;
   a ventilation aperture running from said upper surface through said body to said lower surface; and
   a porous venting medium positioned in said ventilation aperture.

8. The stopper of claim 7, wherein said power source comprises a replaceable battery.

9. The stopper of claim 7, wherein said power source is positioned within an aperture in said stopper, wherein a cap is positioned on an upper surface of said power source to cover said power source.

10. The stopper of claim 7, wherein at least a portion of said parameter sensor extends downwardly a predetermined distance into said flask.

11. An apparatus, comprising:

a flask;

a stopper having a body including an upper surface, a lower surface, and a peripheral edge defining an interior area, wherein said peripheral edge is configured to be removably secured in an upper portion of said flask;

a control unit positioned in said interior area;

a parameter sensor connected to said control unit, wherein at least a portion of said parameter sensor protrudes from said lower surface of said body;

a radio frequency transmitter connected with said control unit, wherein a first portion of said radio frequency transmitter is positioned within said interior area and a second portion is exposed on said upper surface;

a ventilation aperture running from said upper surface through said body to said lower surface; and a porous venting medium positioned in said ventilation aperture.

12. The apparatus of claim 11, further comprising a power source positioned within said interior area of said stopper, wherein said power source is connected with said control unit.

13. The apparatus of claim 12, wherein said power source is positioned within an aperture in said body, wherein a removable cap is positioned over an upper surface of said power source to seal said power source in said interior area.

14. An apparatus, comprising:

a flask;

a stopper having a body including an upper surface, a lower surface, and a peripheral edge defining an interior area, wherein said peripheral edge is configured to be removably secured in an upper portion of said flask;

a control unit positioned in said interior area;

a parameter sensor connected to said control unit, wherein at least a portion of said parameter sensor protrudes from said lower surface of said body;

a radio frequency transmitter connected with said control unit, wherein at least a portion of said radio frequency transmitter is positioned within said interior area;

a ventilation aperture running from said upper surface through said body to said lower surface; and a porous venting medium positioned in said ventilation aperture.

* * * * *